(12) United States Patent
Cahoon et al.

(10) Patent No.: US 9,751,663 B2
(45) Date of Patent: Sep. 5, 2017

(54) METHOD AND APPARATUS FOR ENCLOSING

(71) Applicant: United Sources Sought, Inc., Victor, NY (US)

(72) Inventors: Jeffrey Cahoon, Williamson, NY (US); Denise Metivier, Pittsford, NY (US)

(73) Assignee: United Sources Sought, Inc., Victor, NY (US)

( * ) Notice: Subject to any disclaimer, the term of this patent is extended or adjusted under 35 U.S.C. 154(b) by 0 days.

(21) Appl. No.: 15/222,291

(22) Filed: Jul. 28, 2016

(65) Prior Publication Data
US 2017/0113846 A1  Apr. 27, 2017

Related U.S. Application Data

(63) Continuation-in-part of application No. 14/924,267, filed on Oct. 27, 2015.

(51) Int. Cl.
| | |
|---|---|
| *B65D 41/02* | (2006.01) |
| *B65D 83/06* | (2006.01) |
| *B65D 53/02* | (2006.01) |
| *B65D 55/16* | (2006.01) |
| *B65D 81/02* | (2006.01) |

(52) U.S. Cl.
CPC ............. *B65D 41/02* (2013.01); *B65D 53/02* (2013.01); *B65D 55/16* (2013.01); *B65D 81/02* (2013.01); *B65D 83/06* (2013.01)

(58) Field of Classification Search
CPC .... B65D 51/244; B65D 81/26; B65D 81/264; B65D 51/30; B65D 41/02; B65D 83/06; B65D 81/02; B65D 55/16; B65D 53/02

USPC ......... 220/319, 521, 522, 256.1, 254.1, 212, 220/694; 206/204
See application file for complete search history.

(56) References Cited

U.S. PATENT DOCUMENTS

| | | | |
|---|---|---|---|
| 2,607,383 A | 8/1952 | Christophersen | |
| 4,767,799 A * | 8/1988 | Thorsrud | C08K 3/22 264/491 |

(Continued)

FOREIGN PATENT DOCUMENTS

WO          0102266 A1     1/2001

OTHER PUBLICATIONS

International Search Report and Written Opinion of the International Searching Authority in corresponding International Application No. PCT/US/2016/058927 (12 pages) completed Jan. 30, 2017.

(Continued)

*Primary Examiner* — Robert J Hicks
*Assistant Examiner* — Kareen Thomas
(74) *Attorney, Agent, or Firm* — Brian B. Shaw, Esq.; Harter Secrest & Emery LLP

(57) ABSTRACT

Presented are an apparatus and method for enclosing. An exemplary apparatus includes a bag having at least a first opening and a second opening, the bag comprising a first sheet coupled to a second sheet along a periphery of the first sheet and the second sheet, and a first closing device coupled to the first opening, the first closing device able to repeatedly open and seal the first opening. The apparatus further includes a second closing device coupled to the second opening, the second closing device able to repeatedly open and seal the second opening.

13 Claims, 10 Drawing Sheets

(56) References Cited

U.S. PATENT DOCUMENTS

| | | | | |
|---|---|---|---|---|
| 5,900,085 | A * | 5/1999 | Clarey | E02D 31/004 156/308.8 |
| 5,956,881 | A * | 9/1999 | Dehm | A01K 97/00 43/4 |
| 6,119,853 | A * | 9/2000 | Garrill | A61M 5/009 206/204 |
| 6,315,112 | B1 * | 11/2001 | Garrill | A61M 15/00 206/204 |
| 6,390,291 | B1 * | 5/2002 | Garrill | A61M 15/00 128/200.23 |
| 6,578,731 | B1 | 6/2003 | Lewis et al. | |
| 2003/0209453 | A1 * | 11/2003 | Herman | A61M 15/009 206/204 |
| 2006/0144726 | A1 * | 7/2006 | Foust | B65D 43/162 206/204 |
| 2006/0144733 | A1 * | 7/2006 | Wu | B65D 43/162 206/368 |
| 2010/0205909 | A1 | 8/2010 | Zimmerman et al. | |

OTHER PUBLICATIONS

Website: http://www.over-board.com.au/waterproof-iphone-case-aqua.html (dated Jul. 26, 2015) 2 pages.

* cited by examiner

| TEST # | TEST NAME | TP# | TASK DESCRIPTION | ACCEPTANCE CRITERIA | COMMENTS | QTY | TEST DURATION (WEEKS) |
|---|---|---|---|---|---|---|---|
| 1 | CYCLE TESTING/DURABILITY | | 1. OPEN AND CLOSE THE POWDERBALL CAP 6500 TIMES | AFTER TEST COMPLETION CAP STILL PASSES WATER SUBMERSION TEST | PERFORM WATER SUBMERSION TEST EVERY 500 CYCLES. ONE DAY TO COMPLETE 500 CYCLES. | 5 | 11 DAYS |
| | | | 2. CYCLE CARABINER 6500 TIMES | CARABINER STILL SNAPS IN PLACE | SIMULATES DAILY USAGE. ONE DAY TO COMPLETE 500 CYCLES. | 5 | 11 DAYS |
| | | | 3. OPEN AND CLOSE THE WIPE CAP 6500 TIMES | AFTER TEST COMPLETION CAP STILL PASSES WATER SUBMERSION TEST AND INTERNAL PRESSURE TEST. | PERFORM WATER SUBMERSION AND INTERNAL PRESSURE TEST EVERY 500 CYCLES. ONE DAY TO COMPLETE 500 CYCLES | 5 | 11 DAYS |
| | | | 4. OPEN AND CLOSE THE COVER AND ZIPPER 3000 TIMES | AFTER TEST COMPLETION CAP STILL PASSES WATER SUBMERSION TEST AND INTERNAL PRESSURE TEST | PERFORM WATER SUBMERSION AND INTERNAL PRESSURE TEST EVERY 500 CYCLES. ONE DAY TO COMPLETE 500 CYCLES | 5 | 7 DAYS |
| 2 | INTERNAL PRESSURE TEST | | MODIFY A WIPE CAP BY ADDING A PRESSURE PORT AND PRESSURIZE THE POUCH | MUST BE ABLE TO HOLD AN INTERNAL PRESSURE OF 4psi FOR 30 SECONDS | SIMULATES FLYING FROM GROUND TO ALTITUDE. | 5 | 2 DAYS |
| 3 | EXTERNAL PRESSURE TEST WATER SUBMERSION | | PLACE THE POUCH IN A CONTAINER FULL OF WATER AND PRESSURIZE THE CONTAINER TO THE EQUIVALENT OF A DEPTH OF 10ft IN SEAWATER | MUST REMAIN IN THE PRESSURIZED CONTAINER FOR AT LEAST 180 SECONDS WITHOUT ANY LEAKS | SIMULATES IF A SOLDIER JUMPS INTO THE WATER. | 5 | 2 DAYS |
| | CARABINER PULL TEST | | PULL CARABINER IN TENSION TO FAILURE | CARABINER MUST FAIL BETWEEN 5 AND 25 lbs. | DO NOT WANT THE SOLDIER GETTING HOOKED ON SOMETHING WHEN IN DANGER. | 5 | 2 DAYS |
| 5 | LANYARD PULL TEST | | PULL LANYARD IN TENSION TO FAILURE | LANYARD MUST FAIL BETWEEN 5 AND 25 lbs. | DO NOT WANT THE SOLDIER GETTING HOOKED ON SOMETHING WHEN IN DANGER. | 5 | 2 DAYS |
| 6 | ENVIRONMENTAL TESTING | | | | | | |
| 4 | THERMAL CYCLING TESTING | | EXPOSE POUCH LOADED WITH OPEN WIPES TO -40°C TO 72°C (-40F TO 160F FOR 10 CYCLES DWELLING AT EACH TEMPERATURE FOR 1 HOUR PER ASTM D 1179-67 METHOD B PROCEDURE B2 | MUST PASS INTERNAL AND EXTERNAL PRESSURE TESTS AT ROOM TEMPERATURE. WIPES TO BE MOIST | SIMULATES STORAGE CONDITIONS. | 5 | 7 DAYS |
| 8 | OZONE EXPOSURE TEST | | PER ASTM D 2565 | NO CRACKS | SIMULATES OUTDOOR EXPOSURE. | 5 | 5 DAYS |
| 9 | UV EXPOSURE TEST | | | PLUS OR MINUS 5 DELTA E AFTER 100 HOURS OF EXPOSURE | SIMULATES OUTDOOR EXPOSURE. | 5 | 5 DAYS |
| 10 | CHEMICAL RESISTANCE | | EXPOSE THE POUCH, WIPE CAP AND SEAL TO MOIST WIPES FOR 70 HOURS AT 70 DEG C | NO MAJOR DEGRADATION OF COMPONENTS AFTER EXPOSURE | SIMULATES LONG TERM EXPOSURE TO WIPES. | 5 | 5 DAYS |
| 11 | DUST EXPOSURE | | EXPOSE THE POUCH TO ISO DUST IN THE DUST CHAMBER FOR 2 HOURS. AFTER 2 HOURS REMOVE THE POUCH, SHAKE OFF LOOSE DUST AND OPEN AND CLOSE THE COVER, ZIPPER, AND CAPS. PERFORM PRESSURE AND SUBMERSION TESTS. | AFTER TEST COMPLETION CAP STILL PASSES WATER SUBMERSION TEST AND INTERNAL PRESSURE TEST. | SIMULATES DESERT DEPLOYMENT. | 5 | 2 DAYS |
| 12 | SQUEAKY CHEEKS POWDER EXPOSURE | | USING THE POWDER BALL DUST THE SEALING SURFACES OF THE WIPE CAP AND POWDER BALL CAP. INSTALL THE CAPS AND PERFORM THE PRESSURE AND SUBMERSION TESTS. | AFTER TEST COMPLETION CAP STILL PASSES WATER SUBMERSION TEST AND INTERNAL PRESSURE TEST. | SIMULATES DAILY USAGE OF THE KIT. | 5 | 2 DAYS |

METHOD AND APPARATUS FOR ENCLOSING

BACKGROUND OF THE INVENTION

Field of the Invention

The present disclosure relates to a method and apparatus for enclosing a product. The present disclosure relates more specifically to a method and apparatus for enclosing from the elements.

Description of Related Art

A bag or sack is a common tool in the form of a non-rigid container. Bags are ubiquitous with many people routinely carrying a wide variety of them in the form of cloth or leather briefcases, handbags, and backpacks, and with bags made from more disposable materials such as paper or plastic being used for shopping. A bag may be closable by a zipper, snap, or fastener or simply by folding.

An empty bag may or may not be very light and foldable to a small size. If it is, this is convenient for carrying it to the place where it is needed, such as a shop, and for storage of empty bags. Bags vary in size from small purses to large suitcases.

BRIEF SUMMARY OF THE INVENTION

In view of the foregoing, it is an object of the present disclosure to provide a method and apparatus for enclosing.

A first exemplary embodiment of the present disclosure provides an apparatus. The apparatus includes a bag having at least a first opening and a second opening, the bag comprising a first sheet coupled to a second sheet along a periphery of the first sheet and the second sheet, and a first closing device coupled to the first opening, the first closing device able to repeatedly open and seal the first opening. The apparatus further includes a second closing device coupled to the second opening, the second closing device able to repeatedly open and seal the second opening.

A second exemplary embodiment of the present disclosure provides a method. The method includes loading a bag through a first opening and a first closing device with a plurality of items, the bag having at least the first opening and a second opening, the bag comprising a first sheet coupled to a second sheet along a periphery of the first sheet and the second sheet. The method further includes removing at least one of the plurality of items maintained within the bag through the second opening and a second closing device.

A third exemplary embodiment of the present disclosure provides an apparatus. The apparatus includes a first sheet surface, and a second sheet surface, a portion of a periphery of the first sheet surface and the second sheet surface coupled together to define an open pocket between the first sheet surface and the second sheet surface, and wherein a portion of the periphery of the first sheet surface and the second sheet surface is not coupled together defining a passage to the open pocket. The apparatus further includes a port on one of the first sheet or the second sheet; the port including a collar with at least two locking protrusions, the port defining a second passage to the open pocket, and a cap, the cap having a ring with locking troughs for locking with the at least two locking protrusions, the collar and the cap able to repeatedly open and seal the second passage. The apparatus further includes a closing device, the closing device coupled to the first sheet surface and the second sheet surface, the closing device able to repeatedly open and seal the passage.

A fourth exemplary embodiment of the present disclosure provides an apparatus. The apparatus includes a container having a hollow center and flexibly opposing walls, the container having a first opening and a second opening, the first opening and the second opening providing a passage to the hollow center, and a first closure device coupled to the first opening, the first closure device operable to open and seal the first opening. The apparatus further includes a second closure device coupled to the second opening, the second closure device operable to open and seal the second opening.

A fifth exemplary embodiment of the present disclosure provides an apparatus. The apparatus includes a cap, the cap comprising a top portion and a bottom portion, the bottom portion having a pocket, and a self-contained dispensable material, the self-contained dispensable material able to be maintained within the pocket, the self-contained dispensable material comprising moisture absorbing powder. The apparatus further including a bottom cap, the bottom cap operable to open and seal the self-contained dispensable material within the pocket.

The following will describe embodiments of the present disclosure, but it should be appreciated that the present disclosure is not limited to the described embodiments and various modifications of the invention are possible without departing from the basic principles. The scope of the present disclosure is therefore to be determined solely by the appended claims.

BRIEF DESCRIPTION OF THE SEVERAL VIEWS OF THE DRAWING(S)

FIG. 1 provides a top perspective view of a device suitable for use in exemplary embodiments of this disclosure.

FIG. 2 provides another top perspective view of the device suitable for use in exemplary embodiments of this disclosure.

FIG. 3 provides a bottom perspective view of the device suitable for use in exemplary embodiments of this disclosure.

FIG. 4 provides a top view of the device suitable for use in exemplary embodiments of this disclosure.

FIG. 5 provides a close-up top view of the device suitable for use in exemplary embodiments of this disclosure.

FIG. 6 provides a perspective view of an exemplary cap suitable for use in exemplary embodiments of this disclosure.

FIG. 7 provides a separated perspective view of an exemplary cap suitable for use in exemplary embodiments of this disclosure.

FIG. 8 provides a logic flow diagram in accordance with a method and apparatus for performing exemplary embodiments of this disclosure.

FIG. 9 provides a perspective view of an exemplary cap and powder ball suitable for use in exemplary embodiments of this disclosure.

FIG. 10 provides a perspective view of an exemplary powder ball suitable for use in exemplary embodiments of this disclosure.

FIG. 12 is a table of testing results of an exemplary embodiment of this disclosure.

DETAILED DESCRIPTION OF THE INVENTION

Whether camping in the wilderness, trekking through the desert, or commuting through a busy urban area it is often important to maintain or have the ability to maintain one's cleanliness. Some of the current products in the marketplace which seek to solve this issue include plastic travel sized containers that are able to contain an alcohol gel based instant hand sanitizer, and disposable baby wipes soaked in a chlorine or alcohol based solution.

However, each of the available solutions have their own draw backs which include portability, susceptibility to water and the elements (e.g., water, dirt, rain, wind), and reusability. Accordingly, there is a need for a device that is able to repeatedly provide sanitary items, wherein the device is portable, air tight, reusable, and resistant to water and other elements.

Embodiments of the present disclosure provide a device and a method of using the device, which is portable, resistant to water and the elements, and can repeatedly provide sanitary items to a user as desired. Embodiments of the present disclosure further provide a device that is also rugged such that it can provide a toughness that prevents, for example, ripping, tearing, or breaking. Embodiments of the present disclosure are operable for military use.

Figure 1:
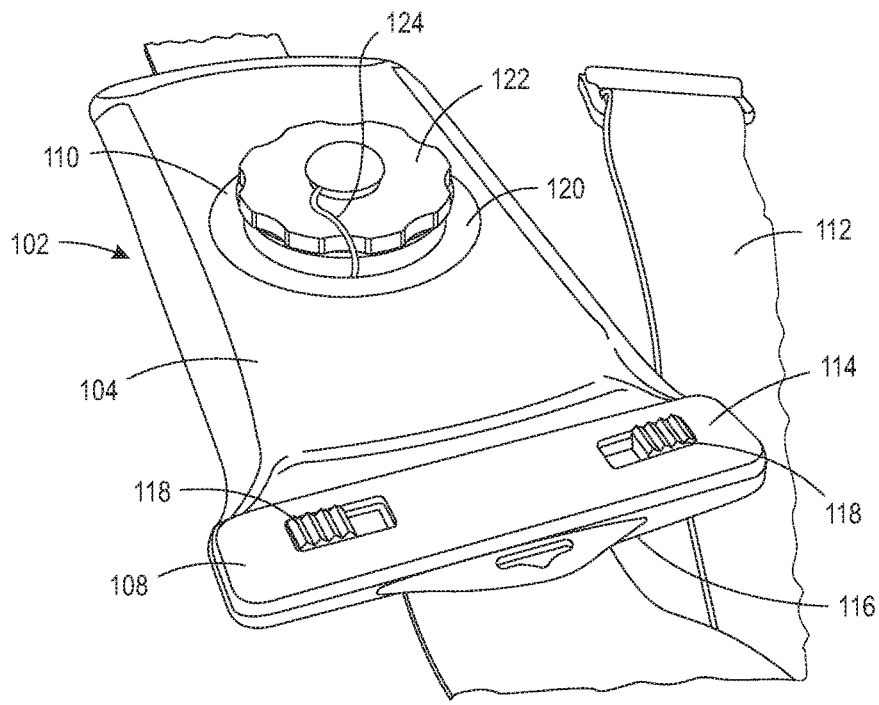

Reference is made to FIG. 1, which provides a top perspective view of a device suitable for use in exemplary embodiments of this disclosure. Shown in FIG. 1 is device 102 including a bag made of a first sheet 104, second sheet 106 (shown in FIG. 3), a first closing element 108 (or first closing device), second closing element 110 (or second closing device), and strap 112.

Second sheet 106 is not shown in FIG. 1 but is located on the opposite side of first sheet 104. The first sheet 104 and the second sheet 106 are coupled to each other along their periphery such that a hollow pocket is formed between first sheet 104 and second sheet 106. The first sheet 104 and the second sheet 106 may be coupled through welding, an adhesive or melting the parts together. In another embodiment, first sheet 104 and second sheet 106 are formed such that they are one continuous sheet, such as through blow molding. The first sheet 104 and the second sheet 106 may be coupled in any fashion such that they provide a watertight seal between first sheet 104 and second sheet 106 at the site of the coupling. Embodiments of first sheet 104 and second sheet 106 are made of a plastic or plastic composite that is, but is not limited to, waterproof. In other words, first sheet 104 and second sheet 106 prohibit water from passing through its surface. In another embodiment, first sheet 104 and second sheet 106 are also air tight, prohibiting the passing of air through its surface. Embodiments of first sheet 104 and second sheet 106 including the sections wherein first sheet 104 is coupled to second sheet 106 have a certain toughness that provides a resistance to cuts, tearing, ripping, scratching, and braking.

Representative materials of the first sheet and the second sheet include, but are not limited to thermoplastics materials, including thermoplastic polyurethane (TPU). These materials are impervious to the passage of water and can maintain the waterproof characteristics across a broad range of temperatures, such as from approximately 120° F. to approximately −40° F. That is, the material is sufficiently resilient to accommodate freezing and thawing of the contents of the device 102. In addition, these materials are inert to water so that water exposed to at least an inner surface of the sheets remains potable. While the thickness of the sheets is at least partly determined by the specific material, a satisfactory thickness for the first sheet and the second sheet formed of TPU has been found to be between approximately 0.45 mm to approximately 0.65 mm.

In the embodiment shown in FIG. 1, first sheet 104 and second sheet 106 (shown in FIG. 3) are coupled together throughout their periphery except the portions of first sheet 104 and second sheet 106 which are coupled to first closing element 108. First closing element 108 is fixedly coupled to first sheet 104 and second sheet 106 along the portion of the periphery of first sheet 104 and second sheet 106 that are not coupled to one another, providing a passage to the hollow pocket between first sheet 104 and second sheet 106. However, it should be appreciated that embodiments include first closing element 108 being removeably coupled to first sheet 104 and second sheet 106.

It should be appreciated that while device 102 is described and depicted in FIG. 1 as having a first sheet 104 and a second sheet 106, embodiments of device 102 include a single sheet or bag like configuration with a hollow pocket or multiple sheets that are coupled to form a hollow pocket.

First closing element 108 is able to repeatedly allow the passage between first sheet 104 and second sheet 106 to be opened and sealed. Embodiments of first closing element 108 are able to seal the passage between first sheet 104 and second sheet 106 such that it prohibits the leaking of water and other elements into the hollow pocket. Thus, the first closing element 108 provides for selective watertight closure. The term watertight is intended to encompass sealed, fastened, or fitted so that no water enters or passes through under intended operating parameters. The term waterproof is used interchangeably herein. In one embodiment, first closing element 108 is waterproof to a maximum depth of 20 feet of water. In another embodiment, first closing element 108 is waterproof to a maximum depth of 10 feet of water.

First closing element 108 includes a top part 114, a bottom part 116, and two slides 118 for sealing and maintaining the first closing element 108 in the sealed or closed position. Top part 114 is coupled to first sheet 104, and bottom part 116 is coupled to second sheet 106. Slides 118 as shown in FIG. 1 are moveably coupled to bottom part 116 and are operable to slide laterally along the long axis of first closing element 108 within first closing element 108. Slides 118 are able to slide from an unlocked position to a locked position pressing and sealing top part 114 and bottom part 116 together and thereby sealing the passage between first sheet 104 and second sheet 106. In the locking position, slides 118 are able to clasp a portion of top part 114 and compress top part 114 and bottom part 116 together creating a seal. For example, in one embodiment, slides 118 can include a tilted plane that can slide over a portion of the top part 114. The tilted plane will urge or press the portion of the top part 114 that comes into contact with slide 118 with more and more force as slide 118 is moved farther in the closed or sealed position.

Second closing element 110 as depicted in FIG. 1 is coupled to first sheet 104. However, embodiments of second closing element 110 can be coupled to either first sheet 104 or second sheet 106 to provide a repeatedly sealable passage to the hollow pocket between the first sheet 104 and the second sheet 106.

Second closing element 110 is able to repeatedly allow and preclude passage to the hollow pocket defined by the first sheet 104 and the second sheet 106. Embodiments of second closing element 110 are able to seal passage to between first sheet 104 and second sheet 106 such that it prohibits the leaking of water and other elements into or out of the hollow pocket. Conversely, the second closing element 110 prevents the egress of water from the hollow pocket. Thus, the second closing element 110 provides for selective watertight closure of the device 102. In one embodiment, second closing element 110 is waterproof to a maximum depth of 20 feet of water. In another embodiment, first closing element 108 is waterproof to a maximum depth of 10 feet of water.

Second closing element 110 includes a collar 120 and a cap 122. Collar 120 is coupled to first sheet 104 along the periphery of collar 120. Collar 120 has an apertured center and provides a passage through first sheet 104 to the hollow pocket between first sheet 104 and second sheet 106.

Embodiments of collar 120 are fixedly coupled to first sheet 104 such that it is both resistant to leaking water or other elements. In one embodiment, collar 120 and first sheet 104 are able to prohibit the passage of water or other elements up to 20 feet of water pressure. Cap 122 can be repeatedly affixed to collar 120 to cover and seal the hollow center of collar 120 to prevent the passage of water or other elements into the hollow pocket. Embodiments of cap 122 include any type of lid, cover, top, or closure that is able to removeably affix to collar 120 as described herein. In one embodiment, cap 122 is removeable from collar 120 one-time and cannot be reattached. In another embodiment, cap 122 can be repeatedly removed and reattached to collar 120.

In one embodiment, collar 120 includes a plurality of protrusions 124 (including ribs or engageable features) along its inside surface extending into its hollow center for interacting and removeably coupling to cap 122. Cap 122 includes a plurality of troughs 126 along an outside surface for interacting and removeably coupling cap 122 to collar 120 by protrusions 124. Troughs 126 include an inclined portion for urging or ramping cap 122 into either the open or sealed position depending upon the desired movement of cap 122 relative to collar 120.

Device 102 includes line 124 moveably coupled to cap 122 and collar 120. Embodiments of line 124 are able to maintain cap 122 in a nearby location relative to collar 120 when cap 122 is detached or removed from covering collar 120.

Strap 112 is removeably and moveably coupled to second sheet 106. Embodiments of strap 112 include strap 112 being removeably and moveably coupled to either first sheet 104 or second sheet 106 or both first sheet 104 and second sheet 106. Embodiments of strap 112 include a buckle of attachment mechanism for securing or coupling strap 112 and device 102 to a user or other device.

In practice, device 102 is operable to maintain within the hollow pocket multiple sanitary wipes or napkins soaked by or moist with a sanitizing solution. A plurality of sanitary wipes can be placed within the hollow pocket through the first closing element 108. Then first closing element 108 and collar 120 and cap 122 can be sealed thereby sealing the sanitary wipes within the hollow pocket preventing or substantially slowing the natural drying process of the sanitary wipes. In one embodiment, device 102 can be loaded with a packet with an opening corresponding to the hollow center of collar 120, wherein the packet is a plastic packet having a plurality of sanitary wipes within the packet. It should be appreciated that embodiments of device 102 are also able to maintain or hold any type of item that is sized to fit into device 102, including electronic devices, water, tools, towels, tissues, napkins, and the like.

Similarly, the watertight capacity of the device 102 by virtue of the material of the first sheet 104, the second sheet 106, the first closing element 108 and the second closing element 110, allows the hollow pocket to be used to retain potable water for the selective consumption or use by the operator. The device 102 can be configured to retain between approximately 8 ounces to approximately 30 ounces of water. This capacity provides a bridging amount of water that can be critical in certain deployments.

After device 102 is loaded with sanitary wipes, the wipes can be accessed individually or in groups through collar 120 and cap 122. A user, when desired, can remove cap 122 from collar 120 to allow access to hollow center and the hollow pocket to obtain as many sanitary wipes as desired. Device 102 when first closing element 108 and collar 120 and cap 122 are in a closed or sealed position prohibits the passage of water and other elements to the hollow pocket and likewise prohibits the passage of water or other fluids from the hollow pocket to an exterior of device 102. By providing a watertight pocket, the device 102 effectively increases the useful life of retained wipes.

Embodiments of sanitary wipes provide an antibacterial, antimicrobial, and antiviral solution. Embodiments of sanitary wipes are also biodegradable, and can have a specific scent or can have no scent.

Figure 2:
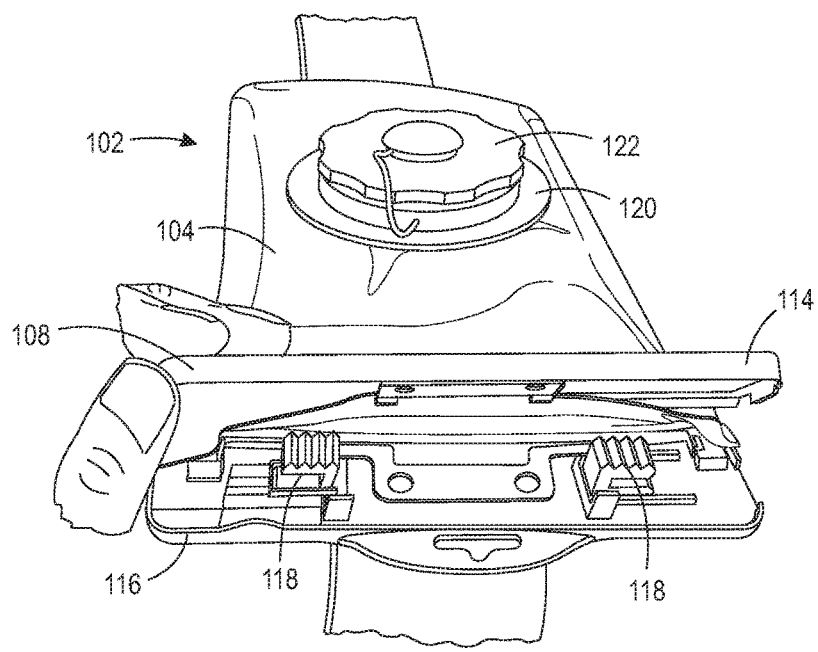

Reference is now made to FIG. 2, which provides another top perspective view of the device suitable for use in exemplary embodiments of this disclosure. Shown in FIG. 2 is device 102 with first sheet 104, first closing element 108 including top part 114, bottom part 116, and two slides 118. Also shown in FIG. 2 is collar 120 and cap 122.

First closing element 108 as depicted in FIG. 2 is in an open position allowing passage to the hollow pocket between first sheet 104 and second sheet 106. First sheet 104 is coupled to top part 114 of the first closing element 108, and second sheet 106 is coupled to bottom part 116 of the first closing element 108. However, it should be appreciated that embodiments of first closing element 108 including top part 114 and bottom part 116 include any configuration that allows first closing element 108 to repeatedly open and seal first sheet 104 and second sheet 106 prohibiting passage of water and other elements into the hollow pocket.

As shown in FIG. 2, slides 118 are slideably coupled to bottom part 116 and are able to slideably lock, clamp, or clasp top part 114 to bottom part 118. It should be appreciated that embodiments of slides 118 can be slideably coupled to either top part 114 or bottom part 116 provided that they are able to repeatedly open and seal bottom part 116 and top part 114 of first closing element 108 together thereby sealing first sheet 104 and second sheet 106 to occlude passage to the hollow pocket.

Figure 3:
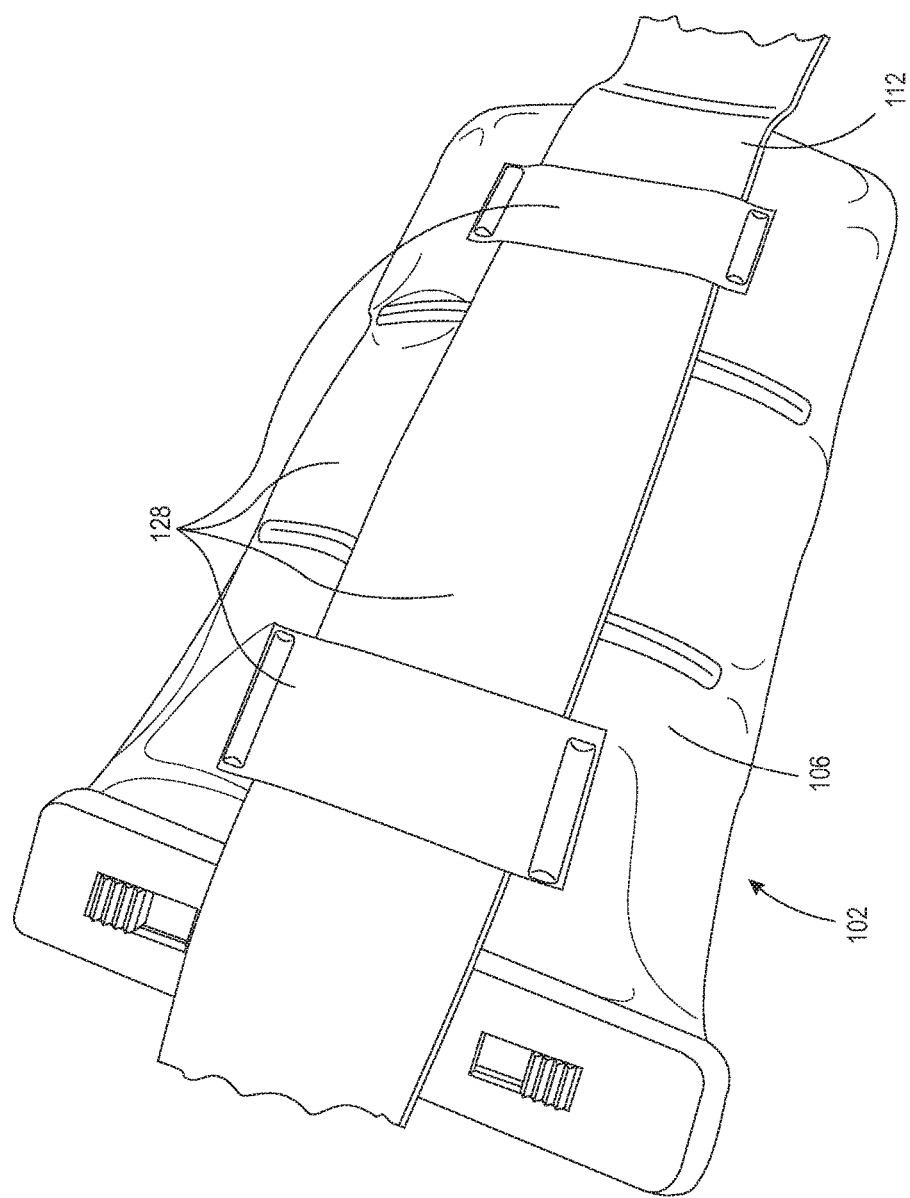

Referring to FIG. 3, shown is a bottom perspective view of the device suitable for use in exemplary embodiments of this disclosure. Shown in FIG. 3 is device 102 with second sheet 106 and strap 112. As depicted in FIG. 3, strap 112 is moveably attached to second sheet 106 through feeds 128. Strap 112 as shown in FIG. 3 is moveably attached to second sheet 106 through two feeds 128. However, device 102 includes multiple feeds 128 for positioning and moveably attaching strap 112 to second sheet 106 as is desired by a user. It should be appreciated that embodiments of strap 112 include strap 112 being fixedly attached to second sheet 106 or first sheet 104 or a combination of both.

Each feed 128 are fixedly coupled to second sheet 106 along their lateral ends thereby providing a hollow passage through and between second sheet 106 and feed 128. It should be appreciated that embodiments of feeds 128 provide a means for moveably attaching strap 112 to device 102. Embodiments of feeds 128 can be located on either first sheet 104, or second sheet 106.

Figure 4:
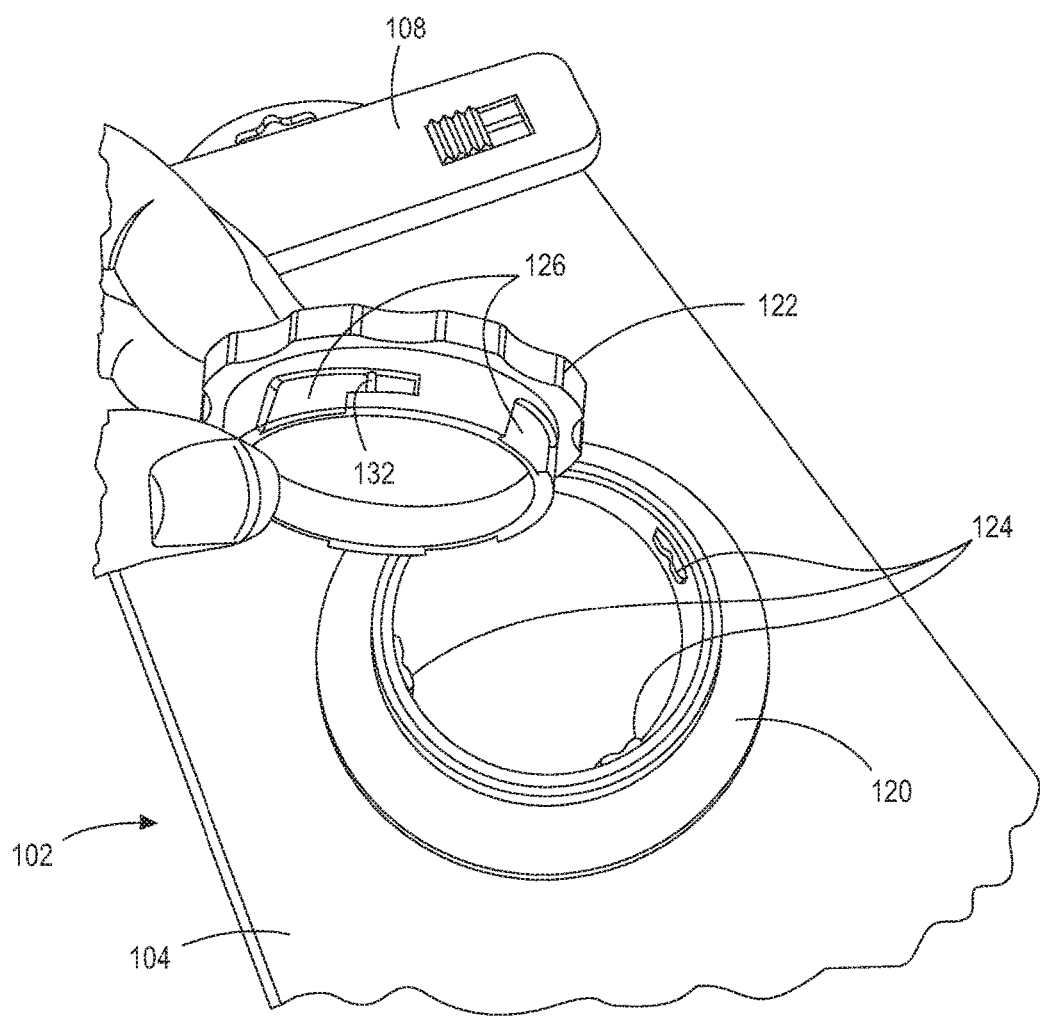

Reference is now made to FIG. 4, which presents a top view of the device suitable for use in exemplary embodiments of this disclosure. Shown in FIG. 4 is device 102 with first sheet 104, first closing element 108, collar 120, and cap 122. Also shown in FIG. 4 are protrusions 124 and troughs 126. protrusions 124 are located along an inside surface of collar 120 extending into its hollow center for interacting and removeably coupling to cap 122. Troughs 126 are located on an outside surface of cap 122 for interacting and removeably coupling cap 122 to collar 120 by protrusions 124.

It should be appreciated that embodiments of protrusions 124 and troughs 126 include any configuration that allow cap 122 to be removeably attached to collar 120 thereby providing a watertight and other element tight seal between cap 122 and collar 120.

Figure 5:
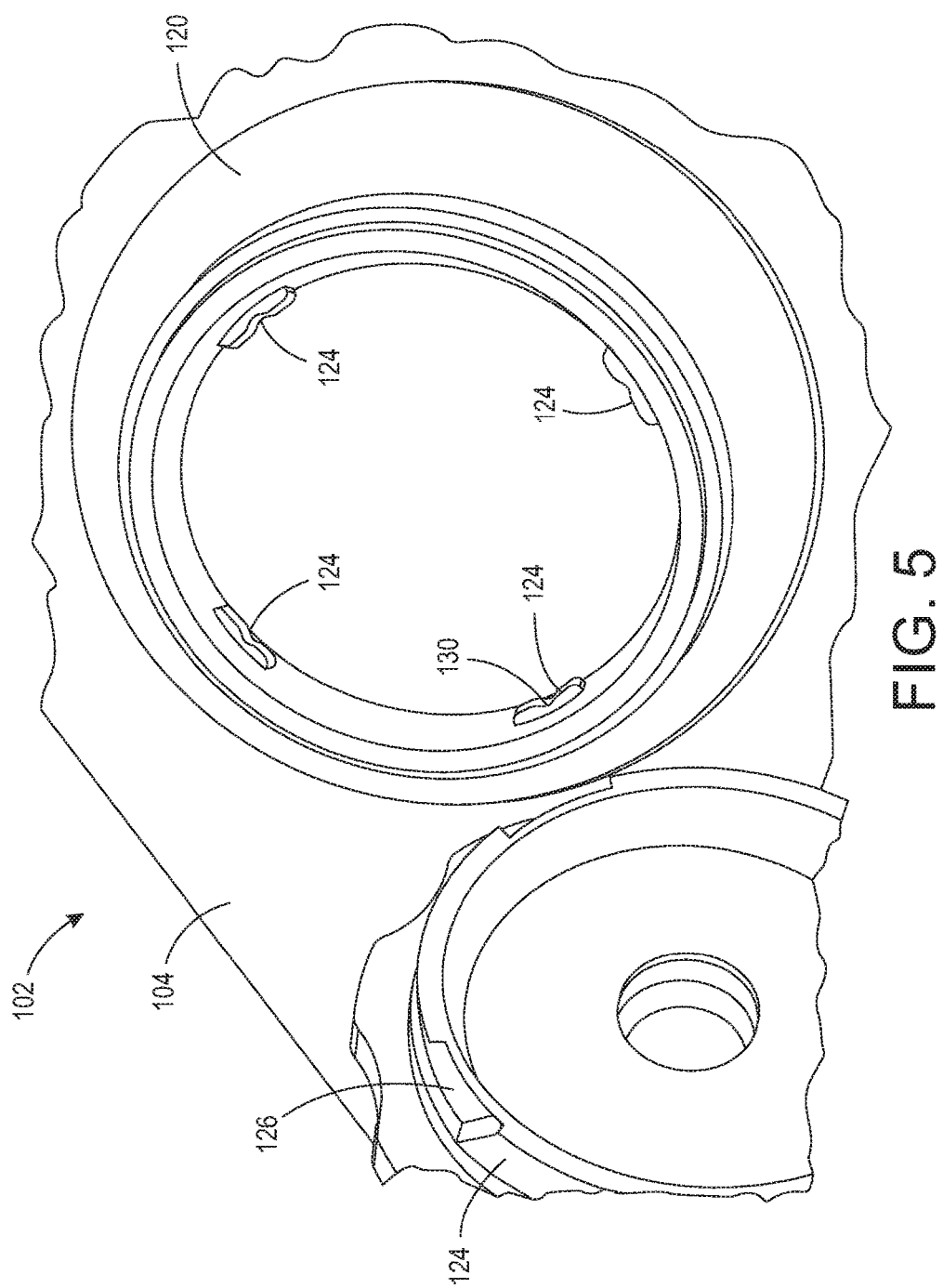

Referring to FIG. 5, shown is a close-up top view of the device suitable for use in exemplary embodiments of this disclosure. Shown in FIG. 5 is device 102, first sheet 104, collar 120, cap 122, protrusions 124, and troughs 126. As shown in FIG. 5, protrusions 124 each provide a raised bar on the surface of the inside of collar 120. Embodiments of protrusions 124 as shown in FIG. 5 can include a divot 130 for interacting with troughs 126 and lip 132 (shown in FIG. 6) within troughs 126 to provide a mechanism to inhibit rotation of cap 122 relative to collar 120.

In the embodiment shown in FIG. 5, cap 122 is sized to interact with collar 120 to secure a portion of cap 122 within collar 120. However, embodiments of the present disclosure include a cap 120 sized to be secured to collar 120. It should also be appreciated that embodiments of protrusions 124 can be located on cap 122 and embodiments of troughs 126 can be located on collar 120.

Figure 6:
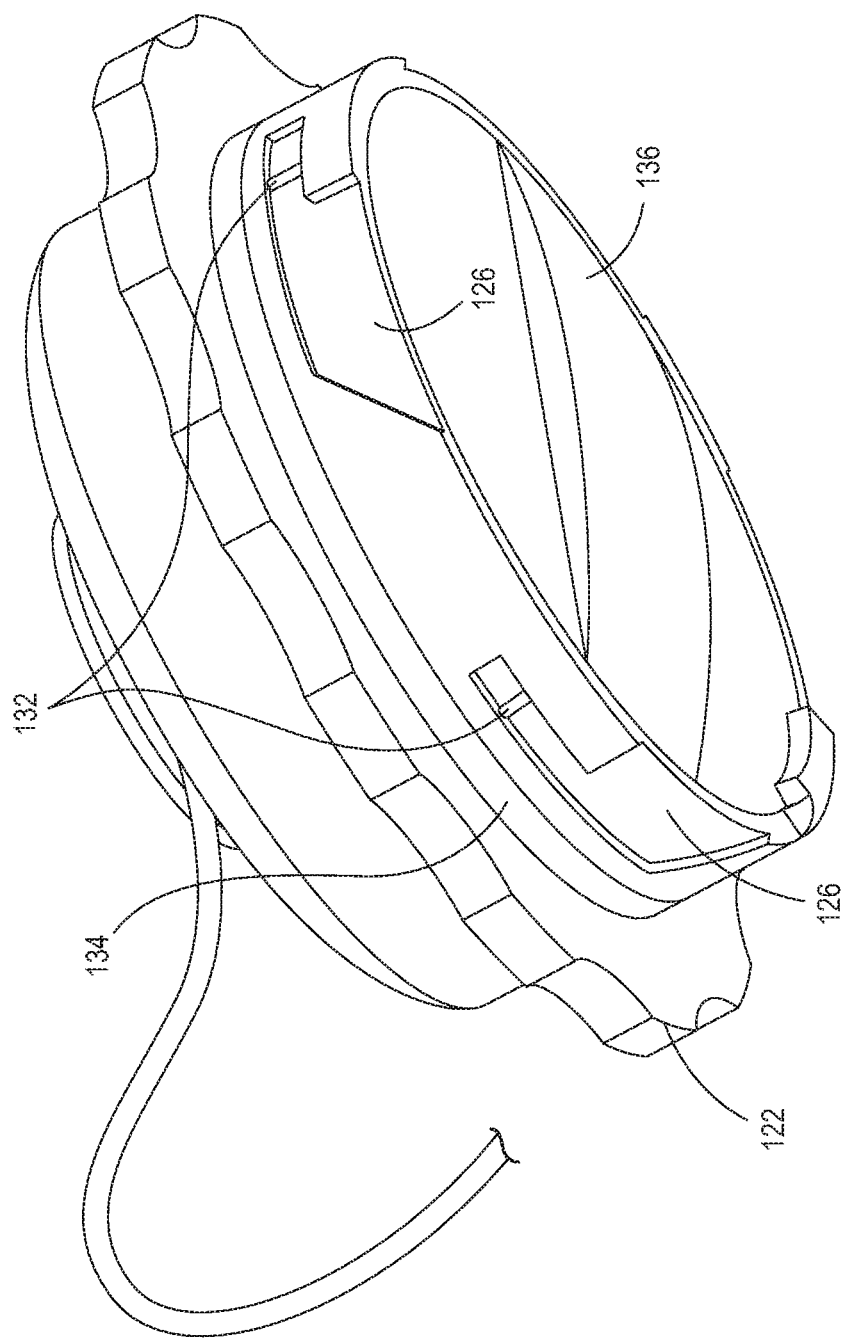

Turning to FIG. 6, shown is a perspective view of a cap suitable for use in exemplary embodiments of this disclosure. Shown in FIG. 6 is cap 122 with troughs 126, lips 132, O-ring 134, and bottom cap 136. Embodiments of lips 132 provide a raised portion of troughs 126 to fit into or interact with divot 130 (shown in FIG. 5) on protrusions 124 in collar 120, thereby providing pressure between lips 132 and divot 130 to aid in maintaining cap 122 and collar 120 in a closed position.

O-ring 134 provides a rubber or rubber like ring for aiding a watertight and/or element tight seal between cap 122 and collar 120. Embodiments of O-ring 134 are sized and located on cap 122 such that O-ring 134 is compressed between cap 122 and collar 120.

Embodiments of cap 122 include a hollow port on the underside of cap 120. Bottom cap 136 is moveably attached to cap 122 to occlude passage to the hollow port. Embodiments of bottom cap 136 are able to be repeatedly released and sealed to cap 122 to provide either access to hollow port or to create a watertight seal between cap 122 and bottom cap 136. Although the bottom portion of the cap 122 is shown as having a pocket, it is understood the bottom cap 136 can define the pocket or the pocket can be defined partly by the bottom cap and partly by the cap.

Figure 7:
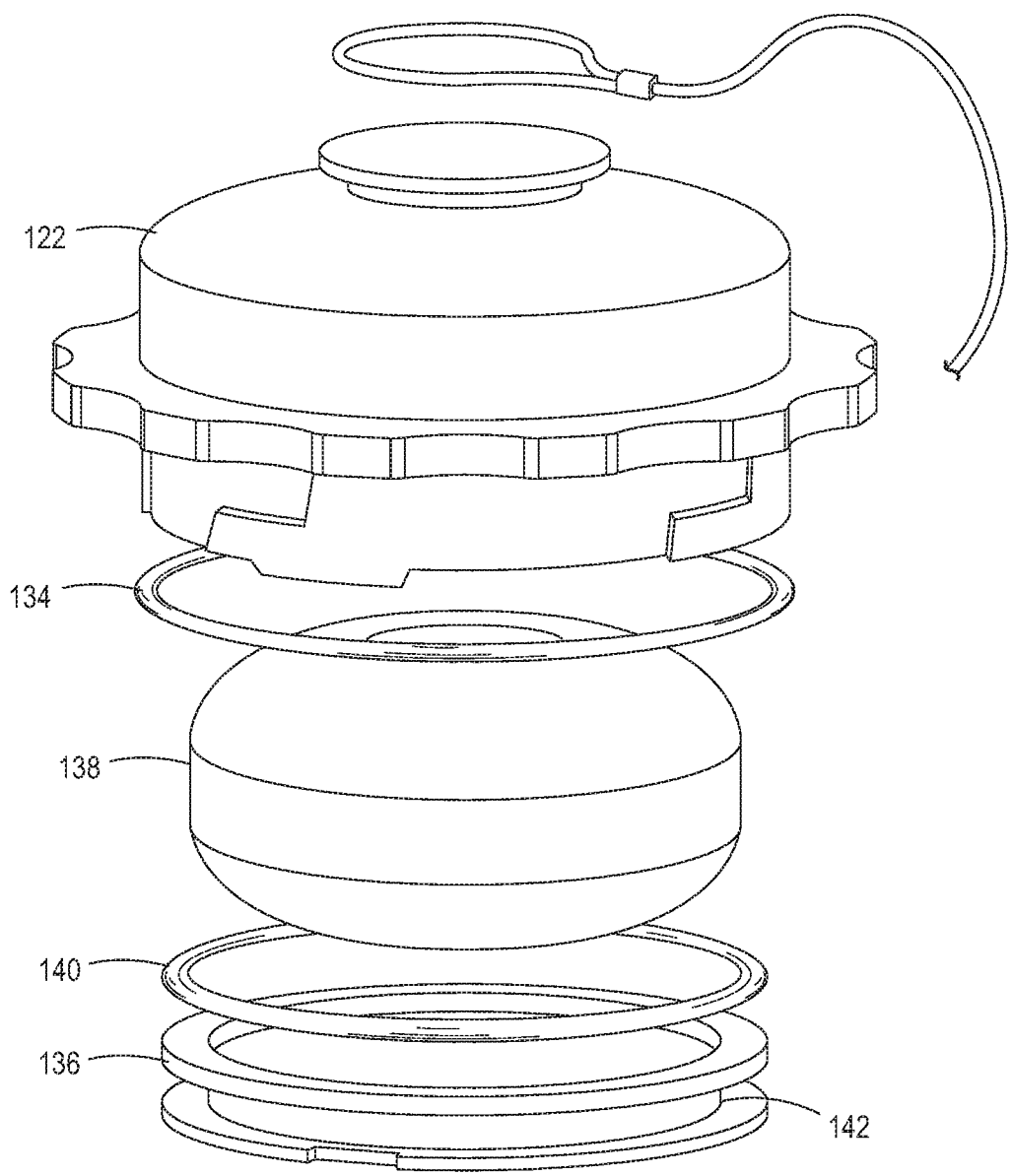

Reference is now made to FIG. 7, which depicts a separated perspective view of an exemplary cap suitable for use in exemplary embodiments of this disclosure. Shown in FIG. 7 is cap 122, O-ring 134, powder ball 138, bottom O-ring 140, and bottom cap 136.

Bottom O-ring 140 is sized to fit within channel 142 of bottom cap 136 for aiding to maintaining a seal between cap 122 and bottom cap 136 when bottom cap 136 is in a closed or sealed position, thereby defining a watertight housing. Embodiments of bottom O-ring 140, bottom cap 136 and cap 122 are able to repeatedly open and seal as the watertight housing, which can be at least partly defined by hollow port of cap 122 such that water and other elements are prohibited from passing between cap 122 and bottom cap 136.

Alternatively, the bottom cap 136 can engage the collar 120 independent of the engagement with the cap 122, such as by a threaded engagement, bayonet or detent engagement as known in the art. This allows the cap 122 to be separated from the bottom cap 136, while the bottom cap maintains a sealed engagement with collar, thereby maintaining the device 102 in a sealed configuration.

Thus, the watertight housing defined by the cap 122 and the bottom cap 136 can be removed from the device in a sealed configuration by removing bottom cap 136 from the collar. The watertight housing can then be separately transported or opened to expose the contents of the housing. Alternatively, the bottom cap 136 can remain engaged with the collar 120 (or the device 102) and removal of cap 122 provides immediate access to the interior of the watertight housing.

Powder ball 138 is a solid powder that has been compressed or disposed into a ball or other shape that can fit into the cap 122 or the watertight housing defined by the cap and bottom cap 136. Embodiments of powder ball 138 can be comprised of chalk or other powder capable of drying or absorbing moisture. Embodiments of powder ball 138 include any type of self-contained dispensable material such as powders, balms, ointments, lotions or the like. It should be appreciated that embodiments of the watertight housing of cap 122 and bottom cap 136 are able to maintain any type of item that is sized to fit within the hollow port or pocket or the watertight housing. For example, the hollow port of cap 122 may be able to maintain contact lenses, lip balm, pills, medicine, creams, liquids, powders, tools, and the like.

Figure 9:
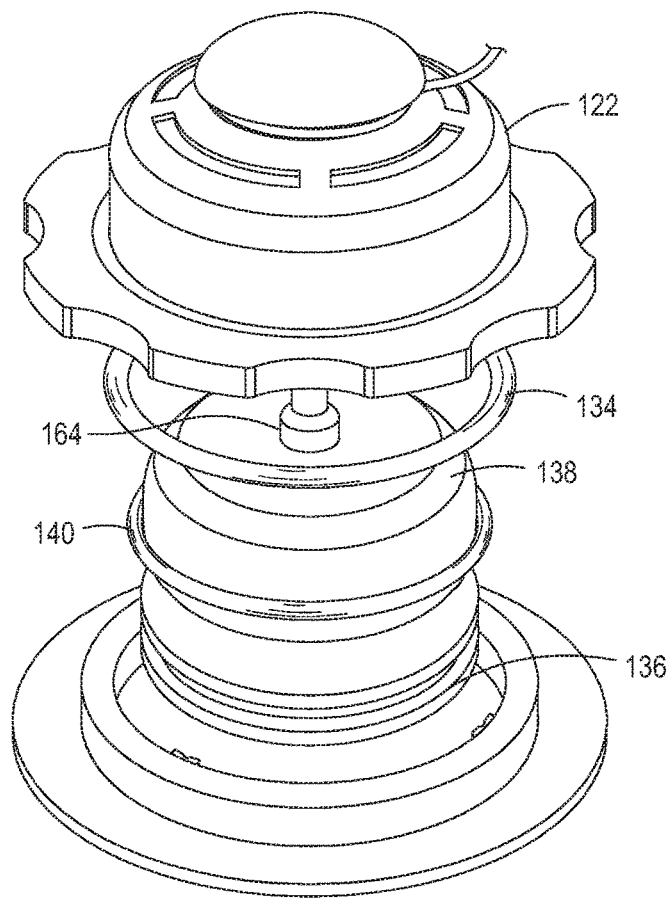
Figure 10:
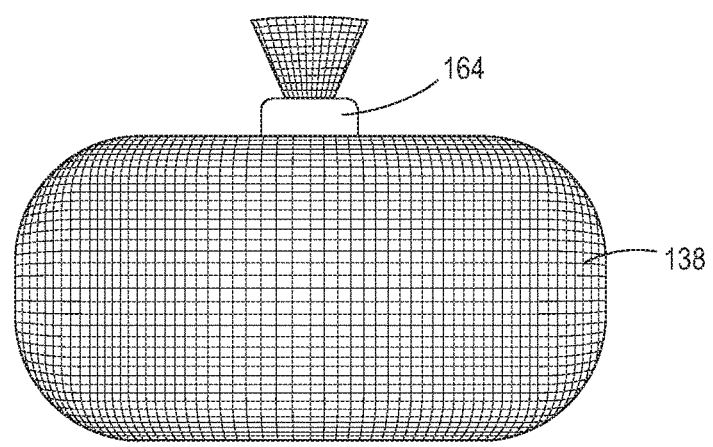
Figure 11:
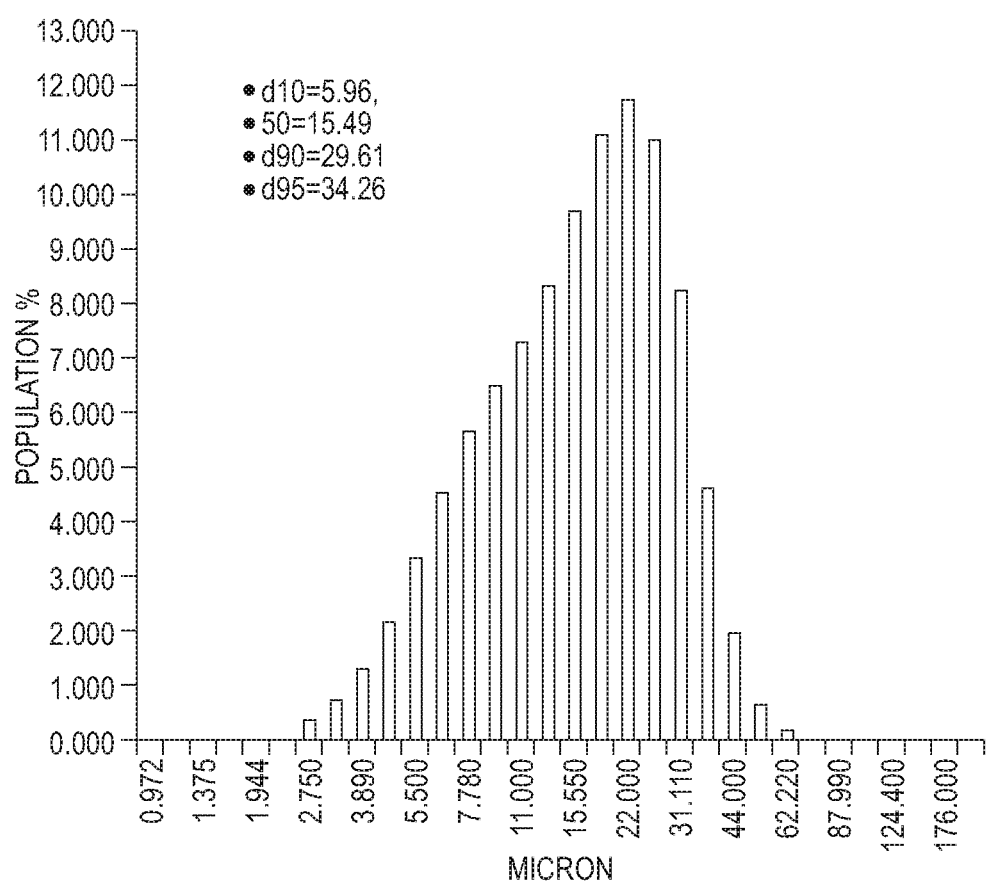
FIG. 11 is a graph of the particle size distribution in an exemplary embodiment of this disclosure.

In a further configuration shown in FIGS. 9 and 10, the powder ball 138 includes a permeable sack 160 retaining a volume of bentonite clay, such as calcium bentonite and in a further configuration a mixture of the bentonite clay and cornstarch and in further configurations the mixture can include slippery elm bark as well as essential oils depending on the intended environment in which the powder ball is intended to be used. Typical compositions of the mixture include between approximately 50% to approximately 99% bentonite clay, between approximately 1% to approximately 25% cornstarch; between approximately 0% to approximately 15% slippery elm bark and between approximately 0% to approximately 10% essential oils.

As bentonite clay is the primary material in the powder ball 138, the description is set forth in terms of retaining and dispensing bentonite clay. However, it is understood the description and operation described herein are equally applicable to the mixtures including bentonite clay.

The bentonite clay has a particle size distribution generally defined by a normal or bell curve, wherein the bell curve is centered at approximately 14 to 16 microns and a standard deviation defined by particle sizes of approximately 11 microns and 40 microns.

The cornstarch is commercially available cornstarch. The essential oil or oils are commercially available concentrated hydrophobic liquid containing volatile aroma compounds from plants. Essential oils are also known as volatile oils, ethereal oils, or simply as the oil of the plant from which they were extracted, such as oil of clove.

Inner bark of the slippery elm is harvested from the main trunk and from larger branches, and is then dried and powdered for use as is well known in the art.

In one configuration, the permeable sack 160 is at least partly formed of a mesh material 162 having a yarn count of approximately 140. However, it is believed that depending on the particle size of the bentonite clay, the mesh size can be between approximately 100 to 140 at a lower limit and approximately 240 at an upper limit. A satisfactory material for the mesh has been found to include polyester or cotton polyester.

For purposes of description, the term "application" or "applied" when used in connection with the powder ball 138 means an intentional dispensing of bentonite clay through the mesh 162 of the permeable sack 160. The force necessary to dispense the bentonite clay can include an acceleration/deceleration of the permeable sack 160 relative to the retained bentonite clay or a movement of the permeable sack, such as rolling, relative to a surface to which the bentonite clay is to be applied. For purposes of description, the term application encompasses the forces generated upon dropping the powder ball 138 from a height of between approximately 1 to approximately 24 inches, as well as forces between approximately ¼ pounds force to approximately 3 to 5 pounds force.

The powder ball 138 can be formed by disposing a volume of the bentonite clay within an elongate sleeve of the mesh material. In packing the bentonite clay within the sleeve, typically less than 50 pounds pressure, and in select configurations, less than 20 pounds, and in certain configurations less than approximately 1 to 10 pounds pressure is used to pack the sleeve. As the material of the permeable sack 160, or the mesh has resiliency, the packed sleeve is segmented by twisting or applying a cinch such as a clamp or band 164. Alternatively, a predetermined amount of bentonite clay can be packed into the sleeve, and the sleeve segmented and then a second loading of the predetermined amount of bentonite clay can be packed into the sleeve.

In certain processes, adjacent bands 164 can be applied between the segmented portions of the loaded sleeve and the sleeve cut between adjacent bands to form the individual powder balls 138. In a further configuration, the powder balls 138 can be formed filling individual sheets of the mesh material and forming the sheet and bentonite clay into a generally ball shape and then applying the band to the gathered portion of the mesh material.

The powder ball 138 can include between approximately 0.5 ounces to approximately 16 ounces, or more of the bentonite clay. Typical weights for the powder ball 138 range between approximately 0.50 ounces to approximately 0.60 ounces, however the range can encompass between approximately 0.25 ounces to approximately 8 ounces.

In use, the powder ball 138 is stored in the watertight housing defined by the cap 122 and the bottom cap 136, and particularly the hollow portion or pocket of the cap 122. When it is desired to employ the bentonite clay, the user removes the watertight housing (the bottom cap 136 and the sealingly engaged cap 122) from the device 102. Alternatively, the cap 122 is removed from the bottom cap 136 to release the powder ball 138. The powder ball 138 is then applied to the desired area of application or rolled or dragged along the desired area of application of the bentonite clay.

The user can determine the amount of applied bentonite clay by employing repeated applications, thereby selectively increasing the amount of bentonite clay dispensed onto the desired area.

Upon application of the desired amount of bentonite clay on the application area, the user returns the powder ball 138 between the cap 122 and the bottom cap 136 to provide for watertight storage of the powder ball.

While the powder ball 138 has been described in terms of bentonite clay, it is understood other non-toxic drying materials can be employed in the powder ball for selective application.

Figure 8:
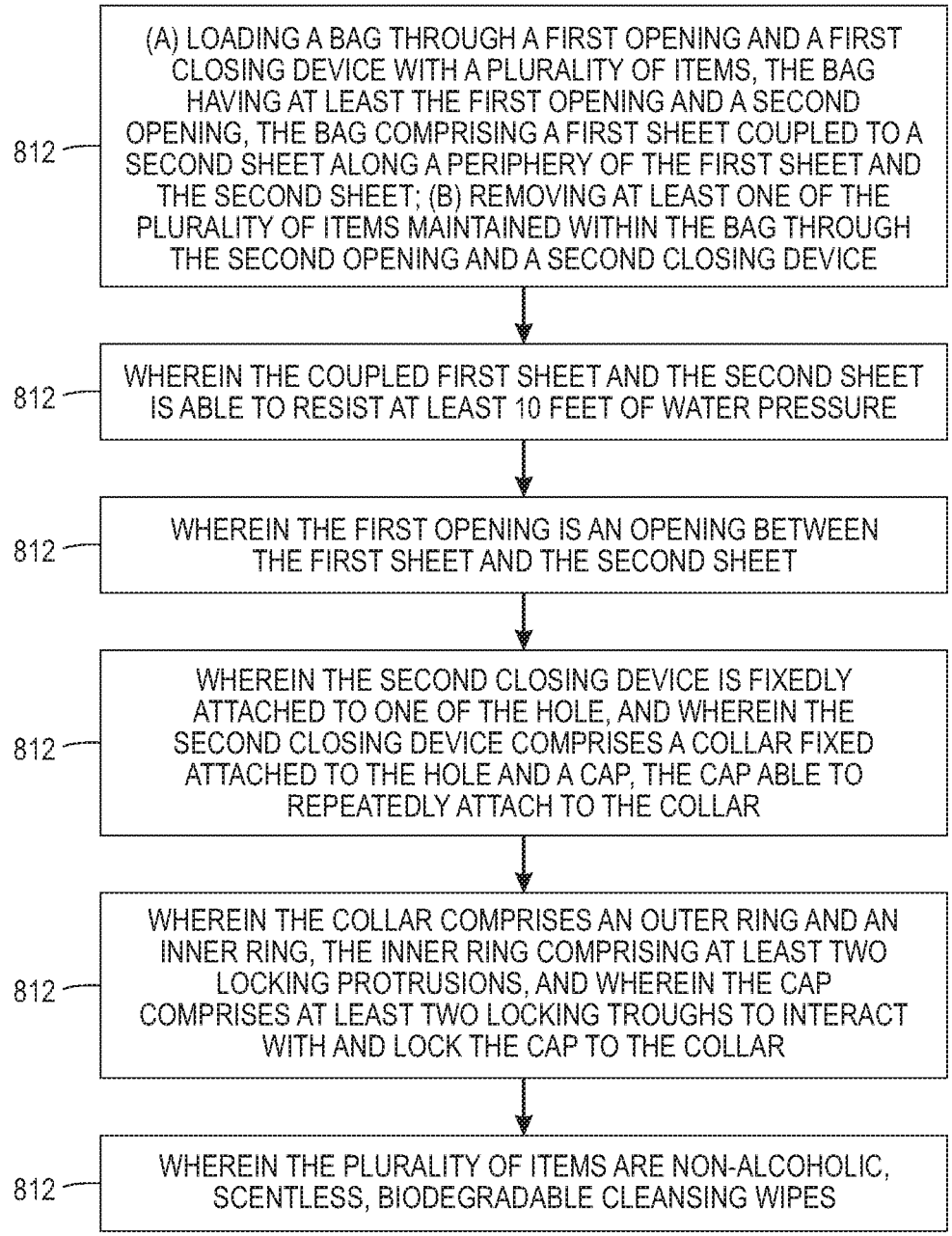

Referring to FIG. 8, presented is a logic flow diagram in accordance with a method and apparatus for performing exemplary embodiments of this disclosure. Block 802 presents (a) loading a bag through a first opening and a first closing device with a plurality of items, the bag having at least the first opening and a second opening, the bag comprising a first sheet coupled to a second sheet along a periphery of the first sheet and the second sheet; (b) removing at least one of the plurality of items maintained within the bag through the second opening and a second closing device. Then block 804 presents wherein the coupled first sheet and the second sheet is able to resist at least 10 feet of water pressure.

Some of the non-limiting implementations detailed above are also summarized at FIG. 8 following block 804. Block 806 specifies wherein the first opening is an opening between the first sheet and the second sheet. Then Block 808 states wherein the second closing device is fixedly attached to one of the hole, and wherein the second closing device comprises a collar fixed attached to the hole and a cap, the cap able to repeatedly attach to the collar. Block 810 then indicates that wherein the collar comprises an outer ring and an inner ring, the inner ring comprising at least two locking protrusions, and wherein the cap comprises at least two locking troughs to interact with and lock the cap to the collar. Block 812 then relates to wherein the plurality of items are non-alcoholic, scentless, biodegradable cleansing wipes.

Thus, the materials and construction of the first sheet 104, the second sheet 106, the first closing element 108 and the second closing element 110, the device 102 is a watertight, multifunctional, modular kit and system that can retain critical water reserves in a potable status, as well as provide sanitary and selectively treatment or drying capacity. The device 102 as a watertight bag able to withstand harsh exterior conditions by components that are constructed as waterproof. The device 102 can conserve and preserve water usage by the watertight construction. The device 102 can maintain water inside the bag and at the same time keep water or contamination, (sand, dirt, insects) out of the bag. As set forth above, the device 102 is formed of low density materials to reduce weight while maintaining the ability to house multiple items (such as but not limited to electronics, paper, water, powders, medicines). In addition, the device 102 can be stored for extended periods, such as 365 days, at temperatures exceeding 120 degrees and temperatures of 40 degrees below zero. In one configuration, the watertight configuration is watertight to depths of 10 feet of water, at a minimum.

In one configuration, the materials and construction of the first sheet 104, the second sheet 106, the first closing element 108 and the second closing element 110, the device 102 able to meet the stress tests as set forth in FIG. 12.

This disclosure has been described in detail with particular reference to a presently preferred embodiment, but it will be understood that variations and modifications can be effected within the spirit and scope of the disclosure. The presently disclosed embodiments are therefore considered in all respects to be illustrative. The scope of this disclosure is indicated by the appended claims, and all changes that come within the meaning and range of equivalents thereof are intended to be embraced therein.

The invention claimed is:
1. A dispenser assembly comprising:
(a) a watertight housing repeatedly moveable between an open configuration and a closed watertight configuration; and

(b) a powder ball sized to be retained within the housing in the closed configuration, the powder ball including a permeable sack retaining a volume of bentonite clay, the permeable sack at least partly formed of a mesh, wherein a particle size distribution of the bentonite clay and a size of the mesh are selected to dispense a portion of the bentonite clay from the permeable sack.

2. The dispenser assembly of claim 1, wherein the powder ball further includes cornstarch.

3. The dispenser assembly of claim 1, wherein the powder ball further includes slippery elm.

4. The dispenser assembly of claim 1, further comprising a bag having at least a first opening and a second opening, the bag comprising a first sheet coupled to a second sheet, a first closing device coupled to the first opening, the first closing device selected to repeatedly open and seal the first opening and a second closing device coupled to the second opening, the second closing device configured to repeatedly open and seal the second opening, wherein the watertight housing is the second closing device.

5. The dispenser assembly of claim 4, wherein the coupled first sheet and the second sheet resist at least 10 feet of water pressure.

6. The dispenser assembly of claim 1, wherein the permeable sack retains a sufficient amount of bentonite clay to provide between approximately 50 applications to 500 applications.

7. The dispenser assembly of claim 1, further comprising a bag having at least a first opening and a second opening, the bag comprising a first sheet coupled to a second sheet, a first closing device coupled to the first opening, the first closing device selected to repeatedly open and seal the first opening and a second closing device coupled to the second opening, the second closing device including the watertight housing configured to repeatedly open and seal the second opening, the second closing device is fixedly attached to a periphery of one of the first sheet or the second sheet around the hole, and wherein the second closing device comprises a cap and a collar fixedly attached to one of the first sheet or the second sheet around the hole, the cap able to repeatedly attach to the collar.

8. The dispenser assembly of claim 7, wherein the collar comprises an outer ring and an inner ring, the inner ring comprising at least two locking protrusions, and wherein the cap comprises at least two locking troughs to interact with the at least two locking protrusions and lock the cap to the collar.

9. A dispenser assembly comprising:
(a) a cap, the cap comprising a top portion and a bottom portion, the bottom portion having a pocket;
(b) a bottom cap, the bottom cap operable to repeatedly and sealingly engage the cap to define a watertight housing; and
(c) a permeable sack disposed within the watertight housing and retaining a dispensable powder, the permeable sack including a mesh portion and the dispensable powder comprising bentonite clay.

10. The dispenser assembly of claim 9, wherein the cap further comprises a collar with locking troughs, the locking troughs operable to seal the collar and the bottom portion of the cap to a container.

11. The dispenser assembly of claim 9, wherein the cap and the bottom cap in a sealed position is able to resist at least 5 feet of water pressure.

12. The dispenser assembly of claim 9, the apparatus further comprising a lanyard moveably affixed to the cap, the lanyard operable to affix the cap to an item.

13. The dispenser assembly of claim 9, wherein the dispensable powder further comprises slippery elm.

* * * * *